(12) United States Patent
Scholand

(10) Patent No.: US 11,208,140 B2
(45) Date of Patent: Dec. 28, 2021

(54) STEER-BY-WIRE STEERING SYSTEM

(71) Applicant: ZF Automotive Germany GmbH, Alfdorf (DE)

(72) Inventor: Michael Scholand, Wülfrath (DE)

(73) Assignee: ZF Automotive Germany GmbH, Alfdorf (DE)

( * ) Notice: Subject to any disclaimer, the term of this patent is extended or adjusted under 35 U.S.C. 154(b) by 43 days.

(21) Appl. No.: 16/828,461

(22) Filed: Mar. 24, 2020

(65) Prior Publication Data

US 2020/0307672 A1 Oct. 1, 2020

(30) Foreign Application Priority Data

Mar. 25, 2019 (DE) .......................... 102019107577.7

(51) Int. Cl.
| | |
|---|---|
| *B62D 1/185* | (2006.01) |
| *B62D 5/00* | (2006.01) |
| *B62D 1/19* | (2006.01) |
| *B62D 1/181* | (2006.01) |
| *B62D 1/187* | (2006.01) |

(52) U.S. Cl.
CPC .............. *B62D 1/185* (2013.01); *B62D 1/181* (2013.01); *B62D 1/187* (2013.01); *B62D 1/192* (2013.01); *B62D 5/006* (2013.01)

(58) Field of Classification Search
CPC ........ B62D 1/185; B62D 5/006; B62D 1/192; B62D 1/181; B62D 1/187; B62D 1/195; B62D 5/0409

See application file for complete search history.

(56) References Cited

U.S. PATENT DOCUMENTS

| | | | | |
|---|---|---|---|---|
| 2018/0370559 A1* | 12/2018 | Swamidason | .......... | B62D 1/181 |
| 2019/0016365 A1* | 1/2019 | Swamidason | .......... | B62D 5/006 |
| 2020/0339179 A1* | 10/2020 | Nozawa | ............... | B62D 1/181 |
| 2021/0061340 A1* | 3/2021 | Wilkes | ................... | B62D 1/181 |
| 2021/0122405 A1* | 4/2021 | Jo | ............................ | B62D 1/04 |
| 2021/0124349 A1* | 4/2021 | Koehler | ................ | B62D 5/006 |
| 2021/0129892 A1* | 5/2021 | Ryne | ..................... | B62D 1/181 |
| 2021/0129894 A1* | 5/2021 | Ryne | ..................... | B62D 1/187 |

FOREIGN PATENT DOCUMENTS

| | | | | | |
|---|---|---|---|---|---|
| CN | 112298329 A | * | 2/2021 | | |
| DE | 102019106042 A1 | | 9/2019 | | |
| EP | 3730381 A1 | * | 10/2020 | ............. | B62D 1/181 |
| GB | 2558653 A | * | 7/2018 | ............. | B62D 1/187 |

* cited by examiner

*Primary Examiner* — Drew J Brown
(74) *Attorney, Agent, or Firm* — Robert James Harwood

(57) ABSTRACT

A steer-by-wire steering system for a motor vehicle is presented, having a steering means to be held by the driver, a bearing device and an electric steering means actuator. The bearing device has a first sleeve element and a second sleeve element, which are connected to one another to be telescopic along an axial direction of the sleeve elements. The bearing device has a fastening element, which is fixedly connectable to a body of the motor vehicle, wherein the second sleeve element is fixedly mounted on the actuating element and wherein the steering means and the steering means actuator are mounted on the first sleeve element such that they are immovable in relation to the first sleeve element in the axial direction.

20 Claims, 2 Drawing Sheets

STEER-BY-WIRE STEERING SYSTEM

CROSS-REFERENCE TO RELATED APPLICATION

This application claims priority to German Patent Application No. 102019107577.7, filed Mar. 25, 2019, the disclosure of which is incorporated herein by reference in its entirety.

TECHNICAL FIELD

The present disclosure relates to a steer-by-wire steering system for a motor vehicle.

BACKGROUND

In contrast to classic steering systems, steer-by-wire steering systems do not have a direct mechanical operative connection between the steering wheel and wheels of the motor vehicle. Instead, steering signals corresponding to a steering movement are generated and transferred by wire to actuators which convert the steering signals into a steering movement of the motor vehicle.

In this case, a steering wheel actuator, which is designed to impart a desired steering feel to the driver during steering, is typically associated with the steering wheel. For example, the steering wheel actuator simulates a reaction of the roadway on the steering wheel, which, in classic steering systems, is transmitted to the steering wheel via the mechanical operative connection.

With specific regard to self-driven motor vehicles, steer-by-wire steering systems are particularly suitable since the steering wheel is intended to be typically brought into a neutral position in an at least partially autonomous driving mode. In this case, it can also be desirable for the steering wheel to be at least partially retracted with respect to the longitudinal vehicle direction, i.e. displaced in the direction of the dashboard, in the at least partially autonomous driving mode.

SUMMARY

The object of the present disclosure is to provide a steer-by-wire steering system which enables simple longitudinal adjustment of the steering wheel.

The object is achieved according to the present disclosure by a steer-by-wire steering system for a motor vehicle, having a steering means to be held by the driver, a bearing device and an electric steering means actuator, wherein the bearing device has a first sleeve element and a second sleeve element, which are connected to one another to be telescopic along an axial direction of the sleeve elements. The bearing device has a fastening element, which is fixedly connectable to a body of the motor vehicle, wherein the second sleeve element is fixedly mounted on the fastening element, and wherein the steering means and the steering means actuator are mounted on the first sleeve element such that they are immovable in relation to the first sleeve element in the axial direction.

In this case, "fixedly mounted" should be understood to mean that the second sleeve element and the fastening element are non-displaceable relative to one another and, moreover, that the second sleeve element is connected to the fastening element in a rotationally fixed manner with respect to its axial direction. This does not eliminate the possibility of adjusting the inclination of the second sleeve element in relation to the fastening element.

According to the present disclosure, the steering means and the steering means actuator can be displaced in the axial direction of the sleeve elements, and adjusted accordingly, in particular retracted and extended with respect to a dashboard, in a particularly simple manner via a telescopic movement of the sleeve elements. The steer-by-wire steering system according to the present disclosure enables a longitudinal adjustment of the steering means and the steering means actuator over a predefined distance, for example up to 30 cm.

According to a preferred embodiment, the steering means actuator is mounted on the first sleeve element at an end of the first sleeve element which is associated with the steering means, in particular arranged laterally adjacent to the first sleeve element, as seen in the axial direction of the sleeve elements. This results in a particularly advantageous configuration of the present disclosure with respect to the installation space required for the bearing device.

In particular, the steering means is designed as a steering wheel. The fastening element is preferably fixedly connectable to a dashboard support of the motor vehicle. An aspect of the present disclosure provides that the two sleeve elements are connected to one another in a rotationally fixed manner. This ensures a stable bearing of the steering means and the steering means actuator.

The bearing device preferably comprises a drive device, which is associated with the first sleeve element and/or the second sleeve element, wherein the drive device is designed to displace the first sleeve element and the second sleeve element relative to one another in the axial direction. Accordingly, the steering means and the steering means actuator can be adjusted automatically by means of the drive device, and without further intervention by the driver. For example, the steer-by-wire system has operating elements which are provided in particular on the steering means and by means of which the driver can control the adjustment of the steering means, Alternatively or additionally, the steering means and the steering means actuator can be adjusted automatically by means of the drive device when the motor vehicle switches to an at least partially autonomous driving mode. The driving device furthermore preferably comprises an electric motor. Alternatively or additionally, the drive device can also comprise a hydraulic and/or a pneumatic drive element.

According to an embodiment of the present disclosure, the electric motor is arranged within the first sleeve element or within the second sleeve element. This results in a particularly space-saving and robust configuration of the bearing device. Alternatively, however, the electric motor can also be arranged outside the sleeve elements.

A drive spindle, which engages in a thread of a conversion device, can be associated with the electric motor. The conversion device is designed to convert a rotary movement of the drive spindle into a relative translatory movement of the two sleeve elements. For example, to this end, the conversion device has a nut, a ball nut and/or an internal thread. In particular, the electric motor is arranged in one of the two sleeve elements and fixedly connected thereto, whilst the conversion device is arranged in the other sleeve element.

An energy absorption device is preferably provided, which is designed to absorb forces acting on the bearing device in the axial direction in the event of a vehicle collision. In the event of a vehicle collision, the energy absorption device contributes to optimally supporting an inflated airbag, for example, and therefore further increasing driver safety. In particular, the energy absorption device is only active in the case of a vehicle collision and/or if a predefined relative movement between the sleeve elements is exceeded.

The energy absorption device is preferably associated with the first and/or the second sleeve element. Accordingly, the energy absorption device is designed to absorb energy from a relative movement between the sleeve elements, in particular wherein the energy absorption device is only activated in the case of a vehicle collision and/or is only operative after a predefined relative movement between the sleeve elements is exceeded. The energy absorption device is designed, for example, in the manner of a spring, as a compressible expanded metal and/or as an absorption strip. In this case, an absorption strip is understood to mean that the energy absorption device permanently deforms and therefore absorbs energy. Bending metal strips, in which the energy from the relative movement of the sleeve elements is converted into a deformation of the metal, are examples of this. In particular, the energy absorption device is accommodated in the first sleeve element and/or in the second sleeve element. This results in a particularly compact configuration of the bearing device.

The bearing device can comprise an inclination adjustment device by means of which an angle of inclination of the second sleeve element relative to the fastening element is adjustable, in particular wherein the inclination adjustment device has a motorized drive device, which is designed to actuate the inclination adjustment device. Accordingly, in addition to the longitudinal adjustment, an angle of inclination of the steering means can be set by means of the inclination adjustment device, in particular wherein the adaptation of the angle of inclination takes place automatically, analogously to the longitudinal adjustment by means of the motorized drive device. In particular, the motorized drive device is designed as an electric motor.

In a possible configuration of the present disclosure, a cable duct is provided, in which power and/or signal cabling of the steer-by-wire steering system is received. In this case, the power and/or signal cabling is associated with the steering means actuator and/or a control unit of the steer-by-wire steering system, which is connected to the steering means actuator, and/or a steering means sensor associated with the steering means, for signal and/or power transmission. The cable duct is designed to compensate a movement of the power and/or signal cabling which occurs during the telescopic movement of the sleeve elements.

In particular, a cable receiving element, which can be designed in the manner of a cable drum, is associated with the cable duct. Upon an adjustment of the steering means in the direction of the dashboard, the cable receiving element receives at least part of the signal and/or power cabling and releases it again upon an adjustment in the opposite direction.

According to a further configuration of the present disclosure, a third sleeve element and a fourth sleeve element are provided, which are connected to one another to be telescopic along an axial direction of the third and fourth sleeve element, wherein the fourth sleeve element is fixedly mounted on the fastening element, and wherein the steering means and the steering means actuator are mounted on the third sleeve element such that they are immovable in relation to the third sleeve element in the axial direction, in particular wherein the unit comprising the third and fourth sleeve element extends parallel to the unit comprising the first and second sleeve element. The steering means and the steering means actuator are therefore guided by means of two telescopic pairs of sleeve elements during a longitudinal adjustment. The steering means and the steering means actuator are therefore mounted in a particularly stable manner and guided (in parallel) in a particularly stable manner during the adjustment.

An upper retaining element is preferably provided at an end of the first and the third sleeve element which is associated with the steering means, wherein the upper retaining element is fixedly mounted on the first and on the third sleeve element at opposite ends, in particular wherein the steering means actuator is fixedly mounted on the upper retaining element. The upper retaining element increases the transverse rigidity of the bearing device and therefore also its natural frequency. An increased natural frequency has the advantage that resonance cannot occur between vibrations and disturbances in the steering system and/or in the body of the motor vehicle, which occur within a certain frequency range, and the bearing device, which means that a reaction of the vibrations and disturbances on the steering means is reduced. The steering means actuator is furthermore preferably mounted on the retaining element, in particular between the two pairs of sleeve elements, as seen in the axial direction of the sleeve elements. This results in a particularly compact configuration of the bearing device.

According to a further aspect of the present disclosure, a lower retaining element is provided at an end of the second and the fourth sleeve element which is associated with the fastening element, wherein the lower retaining element is fixedly mounted on the second and on the fourth sleeve element at opposite ends, in particular wherein the lower retaining element is fixedly mounted on the fastening element. The lower retaining element increases the transverse rigidity of the bearing device and therefore also its natural frequency.

One aspect of the present disclosure provides that a stiffening element is fixedly mounted on the first and on the third sleeve element or on the second and on the fourth sleeve element. The stiffening element further increases the transverse rigidity of the bearing device and therefore also its natural frequency.

An energy absorption device associated with the third and/or the fourth sleeve element is preferably provided, which is designed to absorb forces acting on the bearing device in the axial direction in the event of a vehicle collision, in particular wherein the energy absorption device is accommodated in the third sleeve element and/or in the fourth sleeve element. In this case, the energy absorption device can be designed analogously to the energy absorption device described above.

BRIEF DESCRIPTION OF THE DRAWINGS

Further advantages and properties of the present disclosure are revealed in the description below and the accompanying drawings, to which reference will be made. The drawings show.

DETAILED DESCRIPTION

Figure 1:
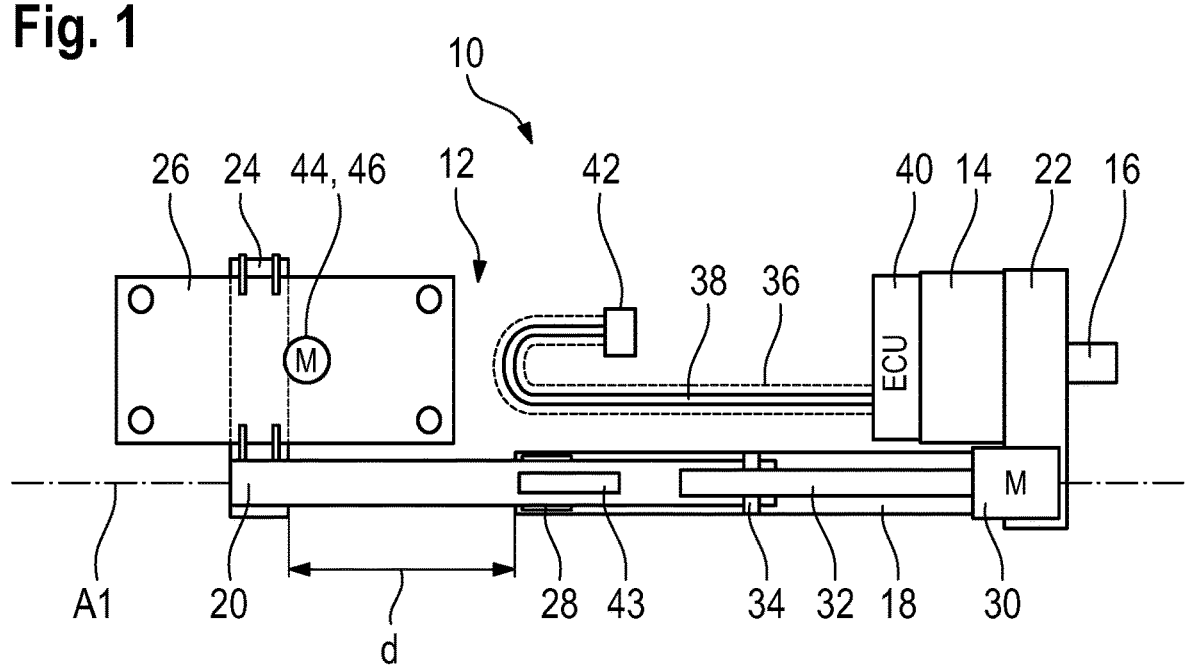
FIG. 1 is a schematic illustration of an inventive steer-by-wire steering system according to a first variant.
Figure 2:
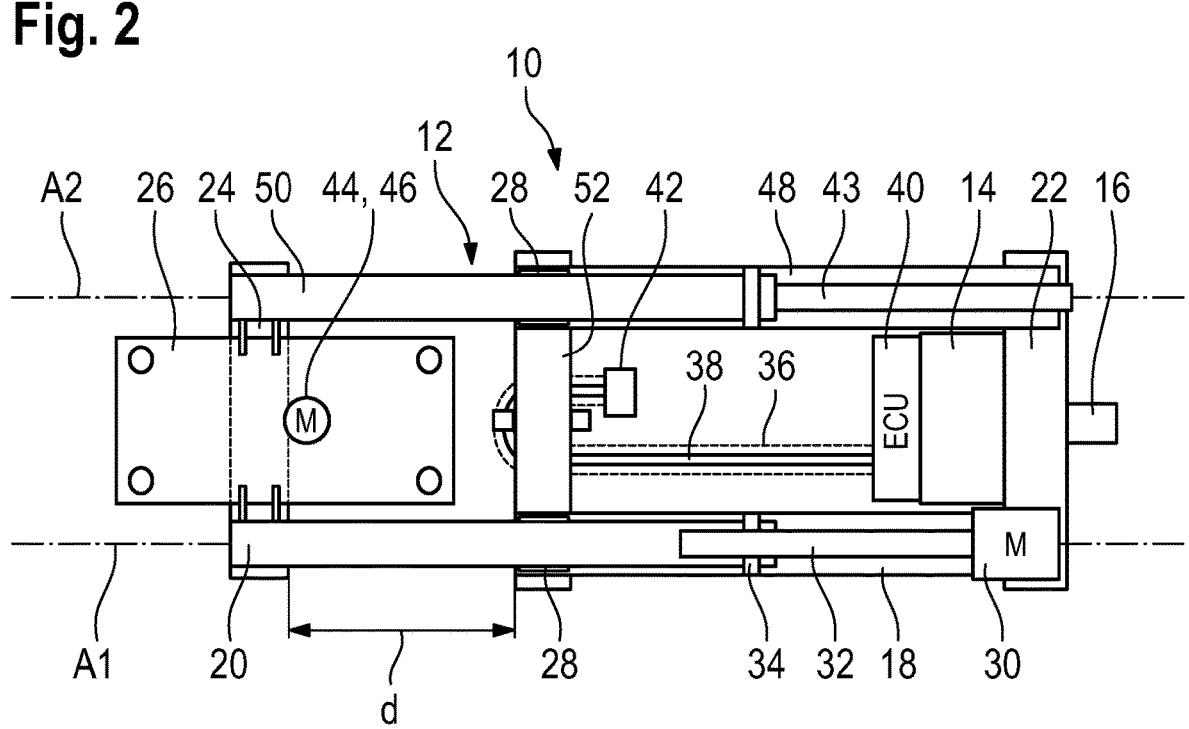
FIG. 2 is a schematic illustration of an inventive steer-by-wire steering system according to a second variant.
Figure 3:
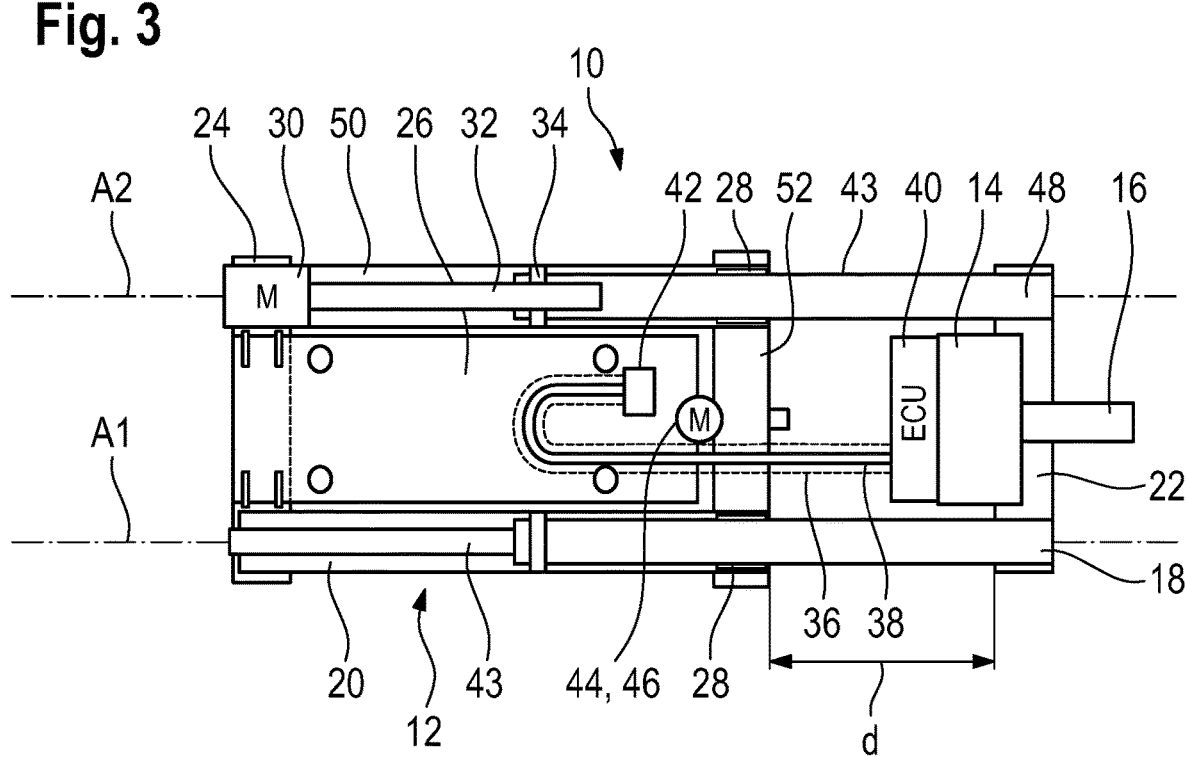
FIG. 3 is a schematic illustration of an inventive steer-by-wire steering system according to a third variant.

In FIGS. 1 to 3, a detail of a steer-by-wire steering system 10 of a motor vehicle is shown schematically in each case according to different variant embodiments. In contrast to classic steering systems, the steer-by-wire steering system 10 does not have a direct mechanical operative connection between a steering means (not illustrated in the figures) and wheels of the motor vehicle. Instead, steering signals corresponding to a steering movement are generated by means of a steering angle sensor and transferred by wire to actuators which convert the steering signals into a steering movement of the motor vehicle. The steering means is, in particular, a steering wheel.

The steer-by-wire steering system 10 comprises a bearing device 12 for the longitudinally adjustable bearing of the steering means and an electric steering means actuator 14 associated with the steering means. The steering means actuator 14 is designed to apply a torque to the steering means via a steering shaft 16, for example to simulate a reaction of the roadway on the steering means and/or a mechanical stop for delimiting the angle of rotation. The variant embodiments described below with reference to FIGS. 1 to 3 differ substantially in terms of the construction of the bearing device 12, wherein components with the same function are provided with the same reference signs.

A first variant embodiment of the steer-by-wire steering system 10 is shown in FIG. 1. The bearing device 12 has a first sleeve element 18, a second sleeve element 20, an upper retaining element 22, a lower retaining element 24 and a fastening element 26. The two sleeve elements 18, 20 are connected to one another to be telescopic along their common axial direction A1. In this case, a portion of the second sleeve element 20 here is received in the first sleeve element 18. The two sleeve elements 18, 20 accordingly have a mutually similar (in the mathematical sense), but otherwise arbitrary, cross-section.

In particular, the two sleeve elements 18, 20 are connected to one another in a rotationally fixed manner, in particular wherein guide means 28 are provided for the rotationally fixed longitudinal guidance of the two sleeve elements 18, 20. At its end associated with the fastening element 26, the second sleeve element 20 is fixedly connected to the lower retaining element 24, which extends transversely to the second sleeve element 20. The lower retaining element 24 is connected to the fastening element 26 such that it is non-displaceable in the axial direction A1. The fastening element 26 is in turn fixedly connectable to the body of the motor vehicle, in particular to a dashboard support. The first sleeve element 18 is fixedly connected to the upper retaining element 22 at its end associated with the steering means.

The steering means actuator 14 is fixedly mounted on the upper retaining element 22. The steering shaft 16 extends from the steering means through the upper retaining element 22 or past the upper retaining element 22 to the steering means actuator 14, wherein the steering shaft 16 is mounted to be rotatable in relation to the upper retaining element 22. Accordingly, the steering means actuator 14 is fixedly connected to the first sleeve element 18, whilst the steering means is rotatably connected to the first sleeve element 18, but such that it is non-displaceable relative to the first sleeve element 18.

A force flow from the steering means to the vehicle body is therefore generated via the steering shaft 16, the upper retaining element 22, the two sleeve elements 18, 20, the lower retaining element 24 and the fastening element 26, wherein the steering means and the steering means actuator 14 are adjustable through a maximum distance d as a result of a telescopic movement of the two sleeve elements 18, 20 in the axial direction A1. The value of the distance d can be adapted to the requirements of the particular motor vehicle.

For example the distance d is up to 30 cm. In particular, the adjustment of the steering means and the steering means actuator 14 takes place automatically by means of an electric drive device 30.

For example, the steer-by-wire system 10 has operating elements which are provided in particular on the steering means and by means of which the driver can control the adjustment of the steering means. Alternatively or additionally, the steering means and the steering means actuator 14 can be adjusted automatically by means of the drive device 30 when the motor vehicle switches to an at least partially autonomous driving mode. In the variant embodiment shown, the drive device 30 is designed as an electric motor and arranged within the first sleeve element 18. Alternatively, however, the drive device 30 could also be arranged in the second sleeve element 20 or outside the two sleeve elements. Furthermore, the drive device 30 can alternatively or additionally also comprise a hydraulic and/or a pneumatic drive element. Associated with the drive 30 is a drive spindle 32, which engages in a thread of a conversion device 34 which is arranged in the second sleeve element 20. The conversion device 34 is designed to convert a rotary movement of the drive spindle 32 into a relative translatory movement of the two sleeve elements 18, 20 and to thereby adjust the steering means and the steering means actuator 14 in the axial direction A1.

For example, to this end, the conversion device 34 has a nut, a ball nut and/or an internal thread. A cable duct 36 is furthermore provided, in which power and/or signal cabling 38 of the steer-by-wire steering system 10 is received. In this case, the power and/or signal cabling 38 is associated with the steering means actuator 14 and/or a control unit 40 of the steer-by-wire steering system 10, which is connected to the steering means actuator 14, and/or a steering means sensor associated with the steering means, for signal and/or power transmission. The cable duct 36 is designed to compensate a movement of the power and/or signal cabling 38 which occurs during the telescopic movement of the sleeve elements 18, 20.

In particular, a cable receiving element 42, which can be designed in the manner of a cable drum, is associated with the cable duct. Upon an adjustment of the steering means in the direction of the dashboard, the cable receiving element 42 receives at least part of the signal and/or power cabling 38 and releases it again upon an adjustment in the opposite direction.

An energy absorption device 43 is provided, which is designed to absorb forces acting on the bearing device 12 in the axial direction A1 in the event of a vehicle collision. In particular, the energy absorption device is only activated in the case of a vehicle collision and/or if a predefined relative movement between the sleeve elements 18, 20 is exceeded. The energy absorption device 43 is associated with the first and/or the second sleeve element 18, 20. Accordingly, the energy absorption device 43 is designed to absorb energy from a relative movement between the sleeve elements 18, 20.

The energy absorption device 43 is, for example, in the form of a spring, which is designed as a compressible expanded metal and/or as an absorption strip. In this case, an absorption strip is understood to mean that the energy absorption device 43 permanently plastically deforms and therefore absorbs energy. So-called bending metal strips, in which the energy is converted into a deformation of the metal, are examples of this. For example, one end of the absorption strip is then fixedly coupleable to the first sleeve element 18 and another end of the bending metal strip is fixedly coupleable to the second sleeve element 20, in particular wherein the absorption strip is only fixedly connected to both sleeve elements 18, 20 in the case of a vehicle collision.

The bearing device 12 can furthermore comprise an inclination adjustment device 44 by means of which an angle of inclination of the second sleeve element 20 (and therefore also the first sleeve element 18, the steering means actuator 14 and the steering means) relative to the fastening element 26 is adjustable. The inclination adjustment device 44 here has a motorized drive device 46, which is designed to actuate the inclination adjustment device 44.

Accordingly, in addition to the longitudinal adjustment, an angle of inclination of the steering means can be set by means of the inclination adjustment device 44, in particular wherein the adaptation of the angle of inclination takes place automatically, analogously to the longitudinal adjustment by means of the motorized drive device 46. In particular, the motorized drive device 46 is designed as an electric motor.

A second variant embodiment of the steer-by-wire steering system is shown in FIG. 2, wherein only the differences from the variant shown in FIG. 1 are explained below. The bearing device 12 here comprises a third sleeve element 48 and a fourth sleeve element 50, which, analogously to the first and second sleeve element 18, 20, are connected to one another to be telescopic along their common axial direction. The third sleeve element 48 is fixedly connected to the upper retaining element 22 at its end associated with the steering means. The fourth sleeve element 50 is fixedly connected to the lower retaining element 24 at its end associated with the fastening element 26. In this case, the unit comprising the third and fourth sleeve element 48, 50 extends substantially parallel to the unit comprising the first and second sleeve element 18, 20. Accordingly, the sleeve elements 18, 20, 48, 50 form a parallel guide for the steering means and the steering means actuator 14. As seen along the axial directions A1, A2, the steering means actuator 14 is arranged between the unit comprising the first and second sleeve element 18, 20 and the unit comprising the third and fourth sleeve element 48, 50.

Furthermore, the drive device 30 for the longitudinal adjustment is here associated with the unit comprising the first and second sleeve element 18, 20, whilst the energy absorption device 43 is associated with the unit comprising the third and fourth sleeve element 48, 50. A stiffening element 52 is optionally provided. The stiffening element 52 is fixedly connected at its one end to an end of the first sleeve element 18 which is associated with the second sleeve element 20. At its other end, the stiffening element is fixedly connected to an end of the third sleeve element 48 which is associated with the fourth sleeve element 50.

FIG. 3 shows a variant of the steer-by-wire steering system 10 which is very similar to the variant embodiment shown in FIG. 1. However, a portion of the first sleeve element 18 is received in the second sleeve element 20. Accordingly, a portion of the third sleeve element 28 is received in the fourth sleeve element 50. The drive device 30 here is associated with the unit comprising the third and fourth sleeve element 48, 50, whilst the energy absorption device 43 is associated with the unit comprising the first and second sleeve element 18, 20. The stiffening element 52 is furthermore mounted on the second and on the fourth sleeve element 20, 50.

What is claimed is:

1. A steer-by-wire steering system for a motor vehicle, having a steering means to be held by the driver, a bearing device and an electric steering-means actuator, wherein the bearing device has a first sleeve element and a second sleeve element, which are connected to one another to be telescopic along an axial direction of the sleeve elements, the first and second sleeve elements being connected to one another in a rotationally fixed manner, wherein the bearing device has a fastening element which is fixedly connectable to a body of the motor vehicle, wherein the second sleeve element is fixedly mounted on the fastening element, and wherein the steering means and the steering means actuator are mounted on the first sleeve element such that they are immovable in relation to the first sleeve element in the axial direction.

2. The steer-by-wire steering system as defined in claim 1, wherein the bearing device comprises a drive device, which is associated with the first sleeve element and/or the second sleeve element, wherein the drive device is designed to displace the first sleeve element and the second sleeve element relative to one another in the axial direction.

3. The steer-by-wire steering system as defined in claim 2, wherein the drive device comprises an electric motor.

4. The steer-by-wire steering system as defined in claim 3, wherein the electric motor is arranged within the first sleeve element or within the second sleeve element.

5. The steer-by-wire steering system as defined in claim 3, wherein a drive spindle, which engages in a thread of a conversion device, is associated with the electric motor.

6. The steer-by-wire steering system as defined in claim 5, wherein an energy absorption device is provided, which is designed to absorb forces acting on the bearing device in the axial direction in the event of a vehicle collision.

7. The steer-by-wire steering system as defined in claim 6, wherein the energy absorption device is accommodated in the first sleeve element and/or in the second sleeve element.

8. The steer-by-wire steering system as defined in claim 7, wherein the bearing device comprises an inclination adjustment device by means of which an angle of inclination of the second sleeve element relative to the fastening element is adjustable, in particular wherein the inclination adjustment device has a motorized drive device which is designed to actuate the inclination adjustment device.

9. The steer-by-wire steering system as defined in claim 1, wherein a cable duct is provided, in which power and/or signal cabling of the steer-by-wire steering system is received.

10. The steer-by-wire steering system as defined in claim 9, wherein a third sleeve element and a fourth sleeve element are provided, which are connected to one another to be telescopic along an axial direction of the third and fourth sleeve element, wherein the fourth sleeve element is fixedly mounted on the fastening element and wherein the steering means and the steering means actuator are mounted on the third sleeve element such that they are immovable in relation to the third sleeve element in the axial direction, in particular wherein the unit comprising the third and fourth sleeve element extends parallel to the unit comprising the first and second sleeve element.

11. The steer-by-wire steering system as defined in claim 10, wherein an upper retaining element is provided at an end of the first and the third sleeve element which is associated with the steering means, wherein the upper retaining element is fixedly mounted on the first and on the third sleeve element at opposite ends, in particular wherein the steering means actuator is fixedly mounted on the upper retaining element.

12. The steer-by-wire steering system as defined in claim 10, wherein a lower retaining element is provided at an end of the second and the fourth sleeve element which is associated with the fastening element, wherein the lower retaining element is fixedly mounted on the second and on the fourth sleeve element at opposite ends, in particular wherein the lower retaining element is fixedly mounted on the fastening element.

13. The steer-by-wire steering system as defined in claim 12, wherein a stiffening element is fixedly mounted on the first and on the third sleeve element or on the second and on the fourth sleeve element.

14. A steer-by-wire steering system for a motor vehicle, the system comprising:
a steering means to be held by the driver;
a bearing device having first and second sleeve elements, a fastening element and a drive device, the first and second sleeve elements being connected to one another to be telescopic along an axial direction of the first and second sleeve elements, the second sleeve element being fixedly mounted on the fastening element, the fastening element being fixedly connectable to a body of the motor vehicle, the drive device being associated with at least one of the first sleeve element and the second sleeve element, the drive device having an electric motor arranged within one of the first sleeve element and the second sleeve element, the drive device being designed to displace the first and second sleeve elements relative to one another in the axial direction; and
an electric steering means actuator, the electric steering means actuator and the steering means being mounted on the first sleeve element such that they are immovable in relation to the first sleeve element in the axial direction.

15. The steer-by-wire steering system as defined in claim 14, further comprising an energy absorption device designed to absorb forces acting on the bearing device in the axial direction in the event of a vehicle collision.

16. A steer-by-wire steering system for a motor vehicle, the system comprising:
a steering means to be held by the driver;
a bearing device having
a fastening element fixedly connectable to a body of the motor vehicle,
a first sleeve element,
a second sleeve element fixedly mounted on the fastening element, the first and second sleeve elements being connected to one another to be telescopic along an axial direction of the first and second sleeve elements,
a third sleeve element, and
a fourth sleeve element fixedly mounted on the fastening element, the third and fourth sleeve elements being connected to one another to be telescopic along an axial direction of the third and fourth sleeve elements, a unit comprising the third and fourth sleeve elements extending parallel to a unit comprising the first and second sleeve elements;
an electric steering means actuator, the electric steering means actuator and the steering means being mounted on each of the first and third sleeve elements such that the electric steering means actuator and the steering means are immovable in relation to the first and third sleeve elements in the axial directions.

17. The steer-by-wire steering system as defined in claim 16, wherein an upper retaining element, which is associated with the steering means, is provided at an end of the first and third sleeve elements, the upper retaining element being fixedly mounted on the first and third sleeve elements at opposite ends, the steering means actuator being fixedly mounted on the upper retaining element.

18. The steer-by-wire steering system as defined in claim 16, wherein a lower retaining element, which is associated with the fastening element, is provided at an end of the second and fourth sleeve elements, the lower retaining element being fixedly mounted on the second and fourth sleeve elements at opposite ends, the lower retaining element being fixedly mounted on the fastening element.

19. The steer-by-wire steering system as defined in claim 16, wherein the bearing device includes a drive device associated with at least one of the first sleeve element and the second sleeve element, the drive device being designed to displace the first sleeve element and the second sleeve element relative to one another in the axial direction.

20. The steer-by-wire steering system as defined in claim 16, further comprising an energy absorption device designed to absorb forces acting on the bearing device in the axial directions in the event of a vehicle collision.

* * * * *